Nov. 7, 1961  M. H. WOLFBAUER, JR  3,008,032
IMPROVEMENTS IN FLUID-OPERATED PRESSURE-APPLYING DEVICES SUCH
AS PRESSURE-EQUALIZING RESISTANCE WELDING DEVICE
Filed Oct. 23, 1958  3 Sheets-Sheet 1
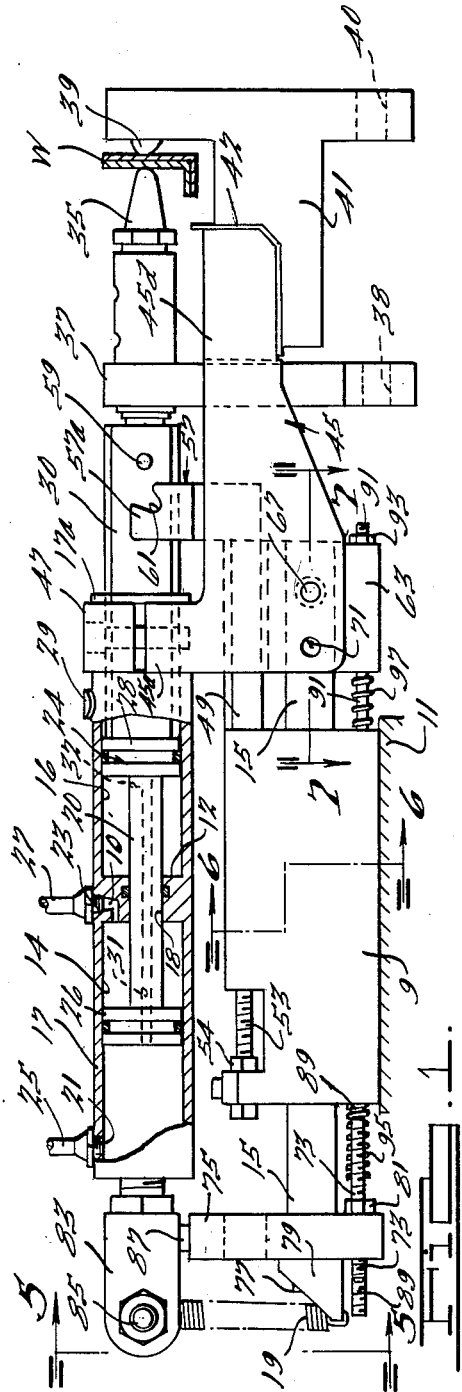
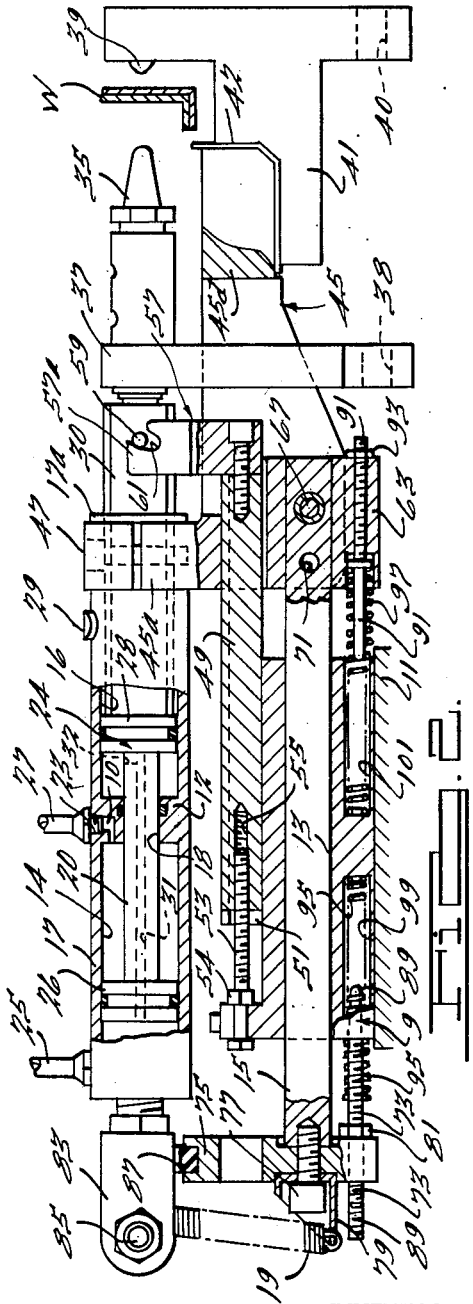
INVENTOR.
Michael H. Wolfbauer, Jr.
BY
William L. Fisher
ATTORNEY.

Nov. 7, 1961   M. H. WOLFBAUER, JR   3,008,032
IMPROVEMENTS IN FLUID-OPERATED PRESSURE-APPLYING DEVICES SUCH
AS PRESSURE-EQUALIZING RESISTANCE WELDING DEVICE
Filed Oct. 23, 1958   3 Sheets-Sheet 2
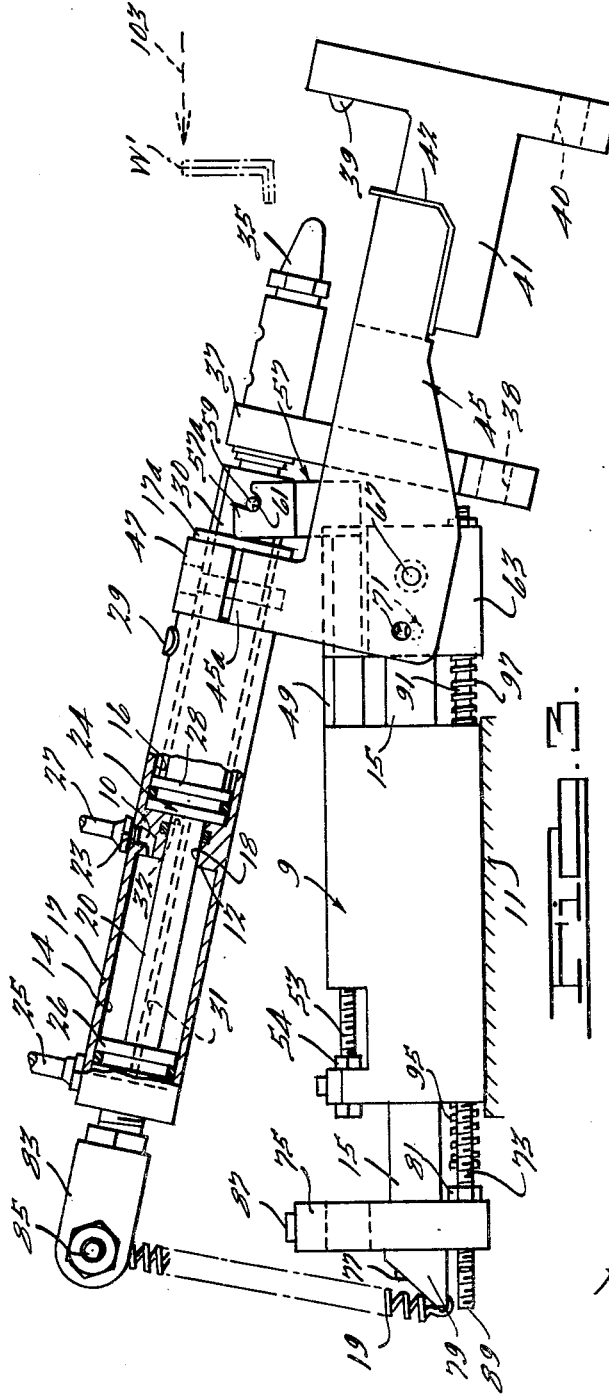
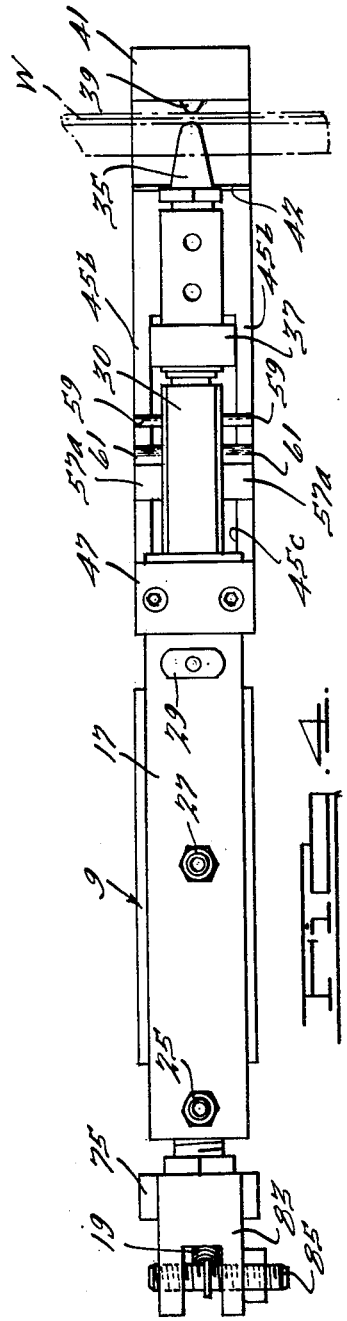
INVENTOR.
Michael H. Wolfbauer, Jr.
BY
William L. Fisher
ATTORNEY.

Nov. 7, 1961 M. H. WOLFBAUER, JR 3,008,032
IMPROVEMENTS IN FLUID-OPERATED PRESSURE-APPLYING DEVICES SUCH
AS PRESSURE-EQUALIZING RESISTANCE WELDING DEVICE
Filed Oct. 23, 1958 3 Sheets-Sheet 3
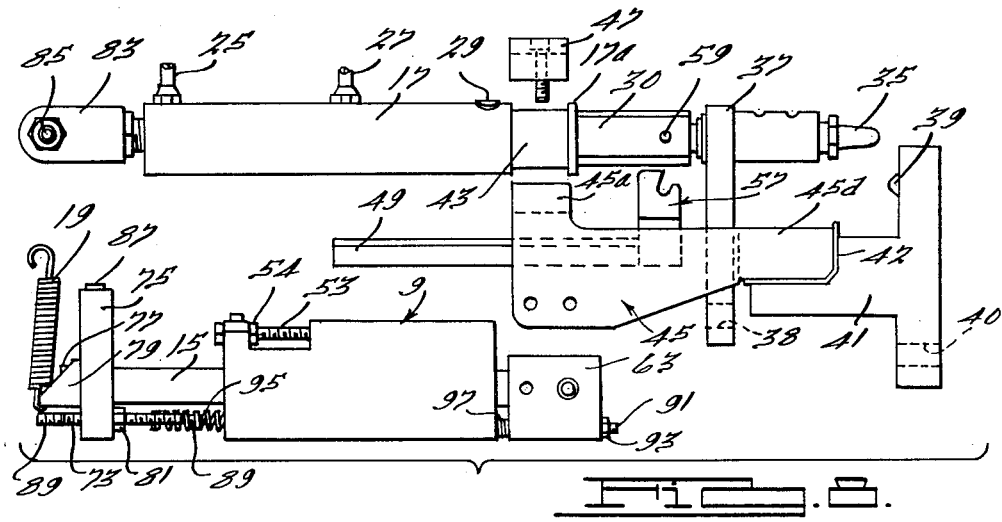
FIG. 4.
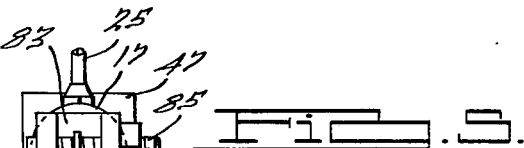
FIG. 5.
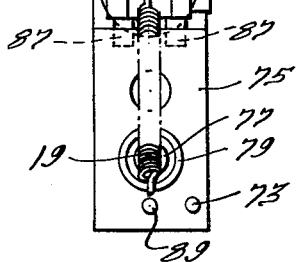
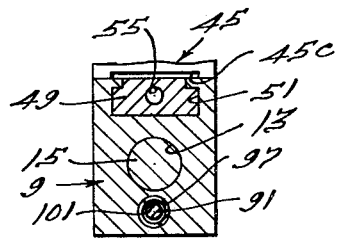
FIG. 6.
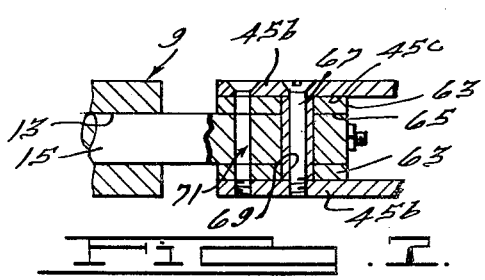
FIG. 7.
INVENTOR.
Michael H. Wolfbauer, Jr.
BY
William L. Fisher
ATTORNEY.

United States Patent Office 3,008,032
Patented Nov. 7, 1961

3,008,032
IMPROVEMENTS IN FLUID-OPERATED PRESSURE-APPLYING DEVICES SUCH AS PRESSURE-EQUALIZING RESISTANCE WELDING DEVICE
Michael H. Wolfbauer, Jr., 20444 Woodland, Wayne County, Mich.
Filed Oct. 23, 1958, Ser. No. 769,168
58 Claims. (Cl. 219—89)

This invention relates to improvements in fluid-operated pressure-applying devices and more particularly to an improved fluid-operated pressure-equalizing resistance welding gun.

Heretofore in the art of fluid-operated devices which equalize the pressures exerted on the work by the pressure-applying tips difficulty has been experienced in tying in the movement of the cylinder with the tip that it carries. Prior proposed devices of this type employ the equalizing means to transmit the force applied by the cylinder to the tip it carries and possess disadvantages inherent in their structures among which are that the gun portions of the devices are inseparably connected to their base portions and the moving parts tend to bind so as to disrupt the equalizing of the pressures at the tips, distort the work and cause wear and breakdown. In high speed production operations such distortions and breakdowns are extremely costly. Moreover, with such prior structures the relative movement of the tips is not readily adjustable and in any case the movement of the tips have been restricted to one plane.

Important objects of the present invention are to provide an improved fluid-operated pressure-applying device which embodies novel combination of structure having a unique function and producing heretofore unobtainable results in this art; to provide an improved fluid-operated pressure-equalizing device which includes a novel tie-in structure between the cylinder and the tip it carries so that the equalizing means is free of the force transmitted between the two thereby creating new function with unexpected advantages; to provide an improved fluid-operated device of the character specified which eliminates distortion of the work and any tendency for the moving parts to bind and which has its gun portion removably connected to its base portion providing unusual flexibility and adaptability in production; and to provide novel parts and subcombinations for fluid-actuated devices of the character indicated.

Still other important objects of the present invention are to provide an improved fluid-operated pressure-applying resistance welding gun characterized in its novel combination of structure which functions unlike prior welding guns of this type to yield entirely new and useful results; to provide an improved fluid-actuated pressure-equalizing resistance welding gun embodying structure inclusive of that indicated above which creates unusual versatility in the movement of the electrodes; to provide an improved welding gun of the character discussed which permits movement of the electrodes in more than one plane whereby the work can move forthwith and head-on into the gap defined by the electrodes in the first plane thus adapting the gun to different work shapes and production set-ups; to provide an improved resistance welding gun of the character mentioned which incorporates structure permitting adjustment of the relative movement of the electrodes; to provide a resistance welding gun of the type indicated having structure which moves the electrodes into selectively settable positions including automatic tripping into and out of a tilted third position; to provide an improved resistance welding gun of the indicated character which incorporates structure to cushion the stroke of each electrode in clamping into the work and to vary not only the position of the gap between the electrodes but their tilted open positions whereby to accommodate alternative constructions of pieces to be welded; to provide in a pressure-equalizing resistance welding device novel means for relating the bus-bar structures of the opposing electrodes so that electrical connection to each bus-bar structure can be effected from a common side of and beneath the cylinder and piston; and to provide novel parts and subcombinations for welding guns of the type specified.

The above and related objects will appear more fully during the course of the following description taken in conjunction with the accompanying drawings.

In the drawings:

FIG. 1 is a side elevational view of a resistance welding gun embodying the present invention shown in one position with parts broken away;

FIG. 2 is a view similar to FIG. 1 of the gun shown in another position and with parts in section;

FIG. 3 is a view similar to the above views of the gun shown in a third position with parts broken away;

FIG. 4 is a plan view of the structure of FIG. 1;

FIG. 5 is a rear elevational view of the structure of FIG. 1 as viewed in the direction of the arrows and substantially along the line 5—5 thereof;

FIG. 6 is a fragmentary vertical sectional view of the structure of FIG. 1 taken substantially along the line 6—6 thereof;

FIG. 7 is a fragmentary horizontal sectional view of the structure of FIG. 1 taken substantially along the line 7—7 thereof; and FIG. 8 is a diminished exploded view of the principal parts of the gun shown in the above views.

Briefly the principal structure of the fluid-operated pressure-equalizing device constituting the subject matter of the present invention comprises, in combination with a fluid-powered piston and cylinder carrying opposing tips, a first novel tie-in structure between the cylinder and the tip that moves with it which is unconnected force-wise with the equalizing means and transmits the force applied to the cylinder to said tip. Such tie-in structure in the preferred embodiment of the invention includes apparatus which connects the front end of the cylinder or its proximal end relative to the opposing tips, with the tip it carries leaving the rear or distal end of the cylinder free. The second tie-in structure is between the cylinder and the equalizing means and is free of the force transmitted between the cylinder and said tip. By virtue of the latter tie-in structure, the equalizing means is free from bending moments or stresses and wear and thus is capable of functioning truly as an equalizing means, itself freely moving and permitting the cylinder to freely move, so that the pressure at the tips are as equal and opposite as is practicably possible and consequently no distortion of the work occurs. In the preferred embodiment, the second tie-in structure joins the proximal end of the cylinder to the corresponding end of the equalizing means leaving the rear or distal end of the latter free. Such combination results in an advantageous arrangement of parts which eliminates integral and inseparable connection between the base portion and the gun portion of the device so that one or another of the latter portions having a different maximum stroke may be readily interchanged on the base portion.

Means are provided in the combination which coact with the foregoing structure to trip the gun portion including at least one of the opposing tips into a position which is angularly disposed with respect to the position the gun portion assumes when the opposing tips are in contact or clamped position to provide greater clearance for the work. This is extremely advantageous particularly when the work is in any way of complicated shape or must approach the tips head-on in a predetermined pattern as might be dictated by the exigencies of the particular production set-up. Such means in the embodiment to be described may be selectively available and may be adjustable so that when desired the gun portion may trip automatically with regular efficiency and without noticeable stress or strain.

The combination also comprises positive stop means on opening including a centering finger functioning in the reverse stroke or movement into open position of the tips which is novel and compactly arranged and made adjustable relative to the base portion of the device and to the position of the work so that the longitudinal position of the center of the gap between the tips can be selectively determined as the work requirements dictate. Spring biasing means for the cylinder and piston functioning in their forward stroke or movement into clamped position of the tips is also included in the combination which cushions the cylinder and piston in their movement in this direction so that the work doesn't have to resist slamming of the tips thereagainst but rather the latter can be brought up extremely fast but gently yet firmly against the work. No only this but for each position of the gap such spring biasing means controls the relative movement of the piston and cylinder so that one or the other electrode can be made to effect all of the movement and between these two extremes virtually infinite adjustment of the relative movement of the electrodes is obtainable.

Referring now to the embodiment of the invention shown which is a fluid-actuated pressure-equalizing resistance welding gun, the base of the gun is indicated generally at 9 and may be mounted in any convenient manner on suitable permanent structure 11. Slidably mounted in a bore 13 within the base 9 is an equalizing shaft 15 the forward end of which is tied-in, as will be described, with the front end of a fluid-actuated cylinder 17 which is mounted above and moveable relative to the base 9. The rearward end of the equalizing shaft 15 while it carries certain structure including a tension spring 19 which will be referred to later is free of unyieldable connection with the cylinder 17. The cylinder 17 has a pair of ports 21 and 23 with suitable fittings 25 and 27, respectively, for connection to a fluid source such as compressed air. A third port, not shown, on the cylinder 17 is plugged by a fitting 29. The port 23 connects with a passageway 10 in a center section 12 of the cylinder 17 which divides the latter into two fluid-isolated chambers 14 and 16, the former communicating with the passageway 10. The center section 12 is provided with a bore 18 in which is slidably disposed and suitably sealed therebetween, as shown, the center portion 20 of the piston rod for a double piston which is employed in the particular embodiment being described, it being understood that a single piston may be substituted if desired. The double piston, indicated generally at 24, is shown in simplified form and comprises piston sections 26 and 28 which are joined by the center portion 20 and operates respectively in the chambers 14 and 16, they being each sealed in their respective chambers by O-ring seals as shown. Thus each chamber will have differential pressure within it on opposite sides of its respective piston section. The piston section 28 is joined to a forward portion 30 of the piston rod which extends beyond the cylinder, the portion 30 being considerably larger than the portion 20 and substantially rectangular in cross-section with chamfered edges in the instance shown. An axial passageway 31 extends through the piston section 26 and through the center portion 20 as shown and terminates behind the piston section 28 where it joins a transverse passageway 32 in the center portion 20 which communicates with the chamber 16 behind the piston section 28 as shown. By this arrangement, the fluid pressure behind the two piston section is always the same and in the case where compressed air is the fluid source will be that of the air at the port 21 which in turn will be either pressure air or exhaust air depending upon whether the port 21 is connected to the pressure side or return side of the air source. Similarly the air pressure ahead of the piston section 26 will be that of the air at the port 23 which may be either pressure air or exhaust air oppositely of that behind the piston sections as will appear hereinafter. The piston 24 carries by way of the forward portion 30 of the piston rod a welding electrode 35 which is joined to bus-bar structure, indicated generally at 37, for feeding current to this electrode by a cable not shown, the aperture 38 in the bus-bar structure 37 being employed to join any cable that may be used. An opposing electrode 39 of a different type in the instance shown, having an L-shaped bus-bar structure, designated 41, is carried by the cylinder 17. The bus-bar structure 41 has a cable-connecting aperture 40 similar to the aperture 38 in the bus-bar structure 37 and the relation between the two bus-bar structures is unique and will be referred to shortly.

Novel tie-in means between the cylinder 17 and the electrode 39 that moves with it is provided which connects said electrode with the front end, or proximal end relative to the opposing electrodes, of the cylinder 17. Such end has an outwardly extending member 17a fitted into it which has formed thereon a shaft portion 43 (FIG. 8) which rests or cradles in the upper end 45a of a yoke member, indicated generally at 45, which is a part of said tie-in means. A correspondingly shaped part 47 fits the shaft portion 43 and is suitably secured and thus secures the cylinder to the end 45a as shown. The shaft portion 43 formed on the member 17a uniquely forms a very convenient means for attaching any size cylinder, i.e., different bore and stroke of piston and in combination with the cradle structure on the end 45a and the part 47 supplies a novel cylinder-attaching means that has all manner of application in this art which may be used to advantage in different devices. The yoke member 45 has bifurcated sides 45b which define a hollow 45c (FIG. 4) between them and which are joined solidly as shown at the upper end 45a, already mentioned, and at the front end which is designated 45d. The front end 45d is joined to the bus-bar structure 41 with suitable insulation separating them such as indicated at 42. The novel yoke member 45, among other novel functions it effects, permits the bus-bar structure 37 for the electrode 35 carried by the piston 24 to extend through its hollow 45c so that the current-carrying cables (not shown) can be fed to a common side of and beneath the cylinder and piston for attachment at the cable-connecting apertures 38 and 40 which is a very decided advantage in and of itself in welding guns of this type since there is less chance for interference by the cables with the work as contrasted with prior devices of this general nature in which the bus-bar structure for the electrode carried by the piston could only extend directly above or to one side of the piston.

It should be noted at this point that the cylinder 17, the electrode 39 that it carries by means of the yoke 45 and the piston 24 together with the electrode 35 that it carries and related parts constitute what is often referred to as the gun portion of the welding gun which, as will appear more fully hereinafter, is separably connected to the base portion of the welding gun. Gun portions having different cylinder bores and different piston strokes may be interchangeably employed on the base portion of the welding gun which in itself has tremendous potential over prior devices of this type. In employing different cylinder bores it is contemplated that the same size shaft portion 43 previously referred to and cradle arrangement on the end 45a of the yoke 45 would be employed irrespective of the bore size of the particular cylinder substituted. The base portion of the welding gun, as far as stationary parts are concerned, includes besides the base proper 9, a slide bar 49 which is moveable longitudinally within a slideway 51 incorporated in the upper forward part of the base 9 as best shown in FIGS. 2 and 6. The slide bar 49 may be fixed in adjustable positions in the slideway 51 by means of a bolt 53, the head end of which is threaded in a lug integrally formed on the upper rearward part of the base 9 and carries a locking nut 54 as shown in FIG. 2. The other end of the bolt 53 is engaged in a threaded aperture 55 formed inwardly from one end of the slide bar 49. The opposite end of the slide bar 49 extends into the hollow 45c in the yoke member 45 and carries a centering finger 57 to which it is fixedly secured as shown by way of example in FIG. 2. The function of the centering finger 57 will be discussed hereinafter but it should be noted that it is enlarged and bifurcated at its upper end forming spaced sides 57a between which the forward portion 30 of the piston rod moves. On each side of the portion 30 a laterally projecting pin or detent 59 is provided to coact, in a manner to be described, with the finger 57 by way of a slot 61 formed in each of its sides 57a as shown.

Reference is now made to the novel equalizing means the effect on which, in large measure, characterizes the combination provided by the instant invention by a difference in kind from that heretofore known in this art. Said equalizing means is structurally tied-in with the cylinder so that it is substantially free of any part of the force that is transmitted between the cylinder 17 and the electrode 39 that it carries. Such tie-in structure between the equalizing means and the cylinder is purposely independent force-wise of the tie-in structure previously mentioned between the cylinder and the electrode that moves with it so that the opposing forces at the electrodes are the most precisely equal and opposite as is attainable. Unexpected advantages including elimination of distortion of the work and pre-eminently more perfect and consistent welds are achieved. It should be noted that the two tie-in structures mentioned while structurally employing a common member, viz., the yoke member 45, in the particular embodiment shown are nevertheless truly independent with reference to the forces applied which is what is important. They are independent force-wise because the force applied to the cylinder is transmitted to the electrode it carries by the first-mentioned tie-in structure but is isolated from the equalizing shaft by the second tie-in structure as will appear more fully hereinafter.

In the particular embodiment shown the equalizing shaft 15 is tied-in with the cylinder 17 at the proximal end of the latter through the lower end of the yoke member 45 and a head 63, the sides of which are machined to snugly fit in the hollow 45c between the sides 45b at the lower rearward part of the yoke member 45. The head 63 is fixedly disposed in this position by means which include a bore 65 extending therethrough and receiving the forward end of the shaft 15, to which the head is secured as well as to the sides 45b, by a fastener 67 which extends through a transverse passageway indicated generally at 69 in FIG. 7 formed by registering apertures in these parts as shown, the aperture in the head 63 having a bushing 70 fitted therein. A similar passageway indicated at 71 is also provided for purposes which will appear later. Another way of effecting a connection between the forward end of the equalizing shaft 15 and the yoke member 45 may be by eliminating the separate head 63 and integrally forming an enlargement on this end of the shaft 15 which may take the shape of the head 63 but which may be narrower than the space between the bifurcated sides 45b to permit thrust bearings or washers to be inserted between the sides 45b, one on each side of such enlargement, for taking up wear from the tripping action or pivotal movement between these related parts as will appear more fully hereinafter.

The tripping mechanism of the invention includes structure carried on the rearward end of the shaft 15 which is unconnected with the cylinder 17 except through the spring 19 so that longitudinal forces cannot be transmitted between the cylinder and such structure. Such structure includes a stud 73 threadably carried in a bar 75 which accommodates the end of the shaft 15 to which it is fastened by a bolt 77 which also secures in position an anchor 79 for the lower end of the spring 19. The stud 73 is longitudinally adjustable relative to the bar 75 for reasons which will appear and may be fixed in position by a locking nut 81. The upper end of the bar 75 serves both as a stop to arcuate movement of and as a rest for the rear or distal end of the cylinder 17 through a clevis 83 which is fixed to said end as shown and carries a transverse bolt 85 to which the upper end of the spring 19 is affixed. The sides of the clevis at times rest on and at other times strike resilient pads 87 carried in the upper end of the bar 75. It should be understood that the structure at the distal end of the cylinder and that carried by the shaft 15 which cooperates with it can be altered by employing equivalent structure which may use a pair of tension springs for example, instead of a single spring.

Spring biasing means for the cylinder and piston are also provided which yieldably absorb the force of each electrode in the final movements of its closing stroke and also control the movement of the electrodes for each position of the gap and include screw threaded members 89 and 91 threadably carried in the lower ends of the bar 75 and the head 63, respectively. The member 89 is threaded in the bar 75 alongside of the stud 73 previously mentioned as best shown in FIG. 5. The members 89 and 91 are longitudinally adjustable and may be fixed in position by locking nuts as shown and indicated at 93 for the member 91. The projecting ends of the members 89 and 91 are without threads and flanged to coact with compression springs 95 and 97, respectively, which are axially aligned with and disposed about said ends as shown in FIG. 2. The springs 95 and 97 operate in blind apertures 99 and 101, respectively, which are formed in the lower portions of the base 9 inwardly from its opposite ends. The springs 95 and 97, respectively, may be tightened by threading the members 89 and 91 closer to the base 9 and may be loosened by backing off of the members 89 and 91. The compression of the springs 95 and 97 determines the relative movement of the electrodes 35 and 39 for each position of the finger 57 and by adjustment of the spring pressures either one of the electrodes 35 and 39 can be made to do all of the opening and closing movement while the other can be made to remain stationary so as to adapt to different workpieces and production set-ups. Moreover, between the two extremes wherein either one of the electrodes can be made to do all of the opening and closing movement while the other can be made to remain stationary, a virtually infinite number of adjustments is possible by co-ordinate balancing of the spring pressures of the springs 95 and 97 so that the relative movement of the tips across the gap is virtually infinitely variable.

In operation of the particular embodiment shown, a source of fluid such as air under pressure through suitable valving and timing mechanism (not shown) is alternately admitted and exhausted through one and the other of the ports 21 and 23 into the cylinder 17 to actuate the piston 24. Assuming that the parts are as shown in FIG. 1 and that the weld has been made on the work part indicated at W therein and that the flow of welding current to the bus-bar structures 37 and 41 has terminated, pressure air is admitted to the chamber 14 of the cylinder 17 through the port 23 on the rod side of the piston section 26 whereupon the piston 24 moves toward the distal end of the cylinder carrying the electrode 35 to the left toward its extreme open position. The exhaust air in the chamber 14 on the opposite side of the piston section 26 and in the chamber 16 on the same side of the piston section 28 is conducted out of the cylinder 17 through the port 21. Simultaneously with the actuation of the piston 24 to the left, the cylinder 17 moves to the right by the force of pressure air on the center section 12 carrying with it, by means of the tie-in structure first mentioned, the electrode 39 toward its extreme open position. It can be seen that the cylinder 17 moves freely because of the equalizing means which includes the shaft 15 to which it is connected as described.

The extreme open position for the electrode 35 is substantially as shown in FIG. 2 which is reached when the detent 59 strikes the finger 57. There is a further rotational movement of the electrode 35 into the position shown for it in FIG. 3 when the piston 24 rotates on its axis as will appear.

The position shown in FIG. 2 for the electrode 39 is not its extreme open position however because the cylinder 17 was stopped short in its opening movement by reason of the stud 73 striking the base 9 as shown therein. For this reason the cylinder 17 and the piston 24 have not seated as they tend to do which can be seen by noting the position of the piston relative to the cylinder in this figure. The cylinder 17 for this setting of the stud 73 has yet to move relative to the piston to carry the electrode 39 to its final open position which it will do by tilting (there being absent a pin or fastener in the passageway 71 as will be explained later) because of the unbalanced force upon it acting in the direction of the right hand as viewed in FIG. 2, this unbalanced force being the unbalanced air pressure in the chamber 14 on the rod side of the piston section 26. This unbalanced force acts essentially against the center section 12 along the longitudinal axis of the cylinder and will be applied through the yoke 45 about a pivot axis defined by the fastener 67 causing the entire gun portion of the welding gun including the cylinder to rotate about said pivot axis in a clockwise direction as viewed in FIG. 2 into a tripped third position as shown in FIG. 3. It can be seen that the moment arm on which this unbalanced force on the cylinder 17 is applied is substantially the distance between the mentioned axis of the cylinder 17 and the pivot axis or fastener 67. It should be remembered that even though at the time the piston 24 had substantially reached the extreme position of its stroke with the detent 59 striking the finger 57, the cylinder 17 had not, having been stopped short in its opening movement, which is why the unbalanced force is developed thereon causing it to rotate. As the cylinder rotates its proximal end 17a moves in an arc clockwise against the finger 57 and the cylinder also causes the piston 24 to rotate in the same direction, the center of rotation or pivot axis for the piston being its own axis or at the detent 59 in the slot 61, this being the reason for the slotted construction on the finger 57. The piston sections 26 and 28 thus move from the positions shown for them in FIG. 2 into those shown in FIG. 3 while the cylinder parts including the proximal end 17a and the center section 12 move from the positions shown for them in FIG. 2 into those shown in FIG. 3. The rotational movement of the cylinder parts is different from that of the piston parts because the cylinder has the furthest pivot axis. Consequently the cylinder rotation relative to that of the piston is greater and therefore moves closer to the piston so that the cylinder and piston seat or bottom as shown in FIG. 3 at the time that the proximal end of the cylinder strikes the finger 57. The cylinder 17 as it rotates thus moves the electrode 39 that it carries into its extreme open position and when its rotation is completed the extreme open position of the electrode 39 is reached as evidenced by the gap between the electrodes 35 and 39 being the greatest for this position as shown in FIG. 3. It should be here noted that all the while this tripping action occurs the cylinder doesn't and cannot move straight horizontally with respect to the base 9 from the instant the stud 73 strikes the latter. This extreme open position into which the cylinder trips is a tilted third position for it and for the entire gun portion of the welding gun.

This tripping action into a tilted third position is accomplished automatically once the proper setting for the stud 73 has been selected, it being noted that the setting for the stud 73 is practically infinitely variable between limits. The closer the stud is moved toward the base 9 the more the stroke of the cylinder in opening will be restricted and the greater will be the tripping action of the gun portion, i.e., the more it will tilt. It will be apparent that the movement of the distal end of the cylinder is in an arc upwardly and forwardly away from the base 9 and takes place against the urging of the tension spring 19. Also, during tilting of the gun portion of the welding gun from the position shown in FIG. 2 to that shown in FIG. 3 the equalizing shaft 15 does not move in any way relative to the base 9, it being prevented from doing so by the coaction of the unbalanced air pressure and the stud 73 bearing against the base 9.

In this tilted position the common plane of the welding tips 35 and 39 is angularly disposed with respect to the plane of the base 9 and to the plane in which the electrodes were disposed when in the former non-tilted position for the gun portion. In this way the work can move straight horizontally or head-on into the gap formerly defined by the electrodes when in the non-tilted position so that when the gun portion re-assumes the non-tilted position the work is already in place ready for the weld stroke and does not have to move first horizontally and then downwardly into the gap between the electrodes as in prior art devices of this type. This is illustrated by reference first to FIG. 3 wherein a new workpart indicated at W' has moved into ready for weld position and can do so by moving straight horizontally in the direction for example as shown by the phantom-lined arrow indicated at 103 in this figure. This is a very practical advantage particularly when the movement of the production parts is necessarily restricted from space limitations and particularly in the case of workparts of complicated shape. For example the workparts may be inverted T shaped and it may be impossible for them to move horizontally and then downwardly, as is necessitated in prior art devices, into the gap between opposing electrode pairs which remain disposed only in one plane. Where, however, such work parts must move straight horizontally they can do so above the tilted swung-away position for the electrode pairs and where they can make no further movement the electrodes by virtue of the present invention will swing upwardly while open to clear the work part, thus entirely alleviating this problem. It should be mentioned that the gap in the open positions for the electrodes 35 and 39 has been greatly reduced in order to conserve space on the drawings and show the welding gun on a proper scale and that in actual practice such gap may be considerably larger to accommodate larger flanged workpieces wherewith the advantages of the tilting action are the greatest.

The gun portion of the welding gun will remain in the tripped third position as shown in FIG. 3 until the direction of air flow from the source of air under pressure is reversed whereby pressure air is admitted to the chamber 14 of the cylinder 17 through the port 21 to the side of the piston section 26 opposite its rod side and to the chamber 16 to the same side of the piston section 28 through the passageway 31 and exhaust air is conducted out of the chamber 14 of the cylinder from the rod side of the piston section 26 through the port 23. Immediately upon this reversal of the air pressure, the force on the center section 12 of the cylinder 17 is removed and the tension spring 19 contracts to its normal compressed condition bringing with it the distal end of the cylinder 17 which assumes a horizontal position with the clevis 83 striking the pads 87 on the top of the bar 75. The forces which maintain the gun portion in its tilted position having been removed, the parts assume the open non-tilted position shown in FIG. 2. The proximal end of the cylinder 17 thus moves counterclockwise in an arc to a horizontal position, the cylinder and electrode 39 rotating about the fastener 67 in a reverse manner from that described. Likewise the piston 24 rotates in a counterclockwise direction about the detent 59 in the slot 61 carrying with it the electrode 35 which is maintained substantially in its extreme open position. The electrode 39 doesn't remain in its extreme open position, however, and as it rotates with the cylinder it moves closer to the electrode 35 into the intermediate open position for it shown in FIG. 2 because of the greater relative rotation of the cylinder as previously explained, the cylinder unseating from the piston and the gap between the electrode pairs closing somewhat as they rotate together but in different amounts into the position shown in FIG. 2. Nevertheless, they are capable of clearing the new workpart, e.g., W' in FIG. 3, which has theretofore new workpart, e.g., W' in FIG. 3, which has therefore moved into position as they swing upwardly and forwardly into the open non-tilted position of FIG. 2.

The piston 24 in the meantime moves under air pressure toward the proximal end of the cylinder carrying the electrode 35 to the right toward its extreme closed or weld position which is reached when this electrode strikes the new work-part to be welded. The electrode 35 is yieldably resisted in its final movement into this position by the action of the compression spring 95 which as will later be explained controls the movement of the piston 24 and permits the work to be gently engaged by this electrode so that slamming of this electrode against the work is eliminated. Simultaneously with the actuation of the piston 24 to the right the cylinder 17 moves to the left carrying with it the electrode 39 toward its extreme closed or weld position. In this action, the force on the cylinder 17 is transmitted through the first tie-in structure mentioned without employing the equalizing shaft to the electrode 39 and is isolated from the equalizing shaft 15, the latter, by virtue of the second tie-in structure, being devoid of any of the force transmitted between the cylinder and electrode 39 and permitting the cylinder 17 to freely move. The extreme closed position for the electrode 39 is reached when it strikes the workpart to be welded and it is yieldably resisted in its final movements into this position by the action of the compression spring 97 which permits the electrode 39 to gently engage the work so that the latter doesn't have to resist any slamming together of the electrode pairs. The parts are then in the position shown in FIG. 1 with the piston 24 moved closer to the proximal end of the cylinder and with the electrode pairs clamped against the workpart to be welded. Welding current is conducted to the electrode pairs through their respective bus-bar structures by the current-carrying cables previously mentioned but not shown for a predetermined time during which the direction of air flow from the source of air under pressure is maintained as last described and for any pre-selected time interval thereafter depending upon the particular application which dictates the cycle for the timing mechanism. When the weld is completed and the flow of welding current has terminated or thereafter at the elapse of the proper time interval if any, the above-described cycles of operations are automatically repeated.

The foregoing operation of the welding gun has been described for a particular setting of the stud 73 which will make the gun portion tilt, i.e., the stud striking the base 9 restricting the opening movement of the cylinder before it has moved the electrode 39 into its extreme open position. Whenever the gun portion tilts the full stroke of the piston is always utilized. The welding gun may operate without the gun portion tilting and also with full stroke of the piston and this is accomplished by backing-off (i.e., retracting in the bar 75 away from the base 9) the stud 73 sufficiently so that it doesn't restrict the opening movement of the cylinder. In this event the cylinder 17 moves all the way to the right, further to the right than that shown in FIG. 2, while remaining in a horizontal position until its proximal end 17a strikes the centering finger 57. The electrode pairs 35 and 39 will have a maximum gap identical to that shown in FIG. 3 corresponding to full stroke of the piston which will be seated in the distal end of the cylinder while they both remain horizontal. Nothing rotates for these settings of the stud 73 and the welding gun will be non-tilting in its action having only two positions, an extreme closed and extreme open horizontal position, the cylinder and piston always remaining horizontal during their movements into and between these positions. When the welding gun is thusly used a fastener may be employed in the passageway 71 to avoid any tendency for the gun portion to tilt.

Whenever it is desired to maintain the electrodes in a single plane at all times that the stud 73 strikes the base 9 to restrict the opening movement of the cylinder this is simply accomplished by inserting a fastener similar to fastener 67 through the transverse passageway 71 so as to forcefully prevent the yoke member 45 from pivoting about the fastener 67. This also has advantages in that the stroke of the piston and thus the gap between the electrodes can be shortened without requiring a new size cylinder and piston which further increases the versatility of the welding gun. There is the limitation in this however that the gun portion cannot tilt when a shortened piston stroke is employed.

The longitudinal position of the centering finger 57 relative to the base 9, as selected by the setting of the bolt 53, determines the location of the geometric center of the gap between the electrodes relative to the base 9 to coordinate with the location of the work. As the finger 57 is moved to the right away from the base 9 the gap between the electrodes moves to the right away from the base and as the finger 57 is positioned closer to the base the gap moves correspondingly closer to the base. In each of its positions the finger 57 serves as a positive stop to the opening movement of each of the cylinder and piston so that in no event can the electrodes fail to open the full amount of the effective piston stroke. This assures that the electrodes will always clear the work whatever happens as for example if one of the springs 95 or 97 break. For each setting of the finger 57 to determine the location of the gap the springs 95 and 97 determine the relative movement of the cylinder 17 and piston 24 and hence of the electrodes across the gap. This can be explained as follows. The equalizing shaft 15 and the gun portion without the resistance of the springs 95 and 97 may be moved freely relative to the base 9. If the spring 97 is tightened sufficiently by the adjusting nut 93 and the spring 95 is correspondingly loosened the equalizing shaft 15 and the entire gun portion will be moved to the right until the proximal end 17a of the cylinder will abut the finger 57. With this adjustment the electrode 39 will not move. It will be prevented from opening because it cannot move against the finger 57 and it will be prevented from closing because of the resistance presented by the tightened spring 97. The piston 24 to which the electrode 35 is attached is offered very much less resistance in closing in comparison to that offered the cylinder and therefore the movement in closing will be solely that of the piston. Similarly if the spring 95 is tightened sufficiently and the spring 97 correspondingly loosened the equalizing shaft 15 and the entire gun portion will be moved to the left until the detent 59 is disposed in the slot 61 and will abut the finger 57. With this adjustment the electrode 35 will not move. It will be prevented from opening because it cannot move against the finger 57 and it will be prevented from closing because of the aid to movement of the cylinder provided by the tightened spring 95. The resistance in closing of the piston is very much greater than that of the cylinder to which the electrode 39 is attached because of the impetus of the tightened spring 95 and therefore the movement in closing will be solely that of the cylinder. Between these two extremes wherein either one of the electrodes can be made to do all of the opening and closing across the gap while the other can be made to remain stationary a virtually infinite number of variations in the relative movement of the electrodes is possible through the co-ordinate adjustment of the spring pressures on the springs 95 and 97. The total distance that the electrodes move of course will always be equal to the length of the gap, which is determined by the effective piston stroke. The spring pressures on the springs 95 and 97 not only provide adjustment of the relative movement of the electrodes across the gap in accordance with the dictates of the particular shape of workpiece to be welded but they also cushion each electrode in clamping onto the work so that they meet the work gently yet firmly as previously mentioned. This in itself is an extremely valuable advantage particularly where relatively delicate workparts must be welded and in contrast with prior equalizing welding guns in which the relative movement of the electrodes was dictated solely by the position of the workpiece within the gap which had to resist the slamming of first one electrode against it, sufficiently so to stop the movement of that electrode, and then the other electrode which would slam into the work backed up by the electrode first to strike it.

To adjust the device for any new production set-up there are three adjustments and any one or more might be required as would be dictated primarily by the location of the workpart relative to the base 9. One would be the setting of the finger 57 to position the gap between the electrodes longitudinally with respect to the base so that the geometric center of the gap would correspond with the center of the workpart whereby the electrodes would be assured of clearing the workpart when opened. Another would be the balancing of the spring pressures on the springs 95 and 97 so that the relative movement of the electrodes across the gap would be in accordance with the location on the workpart where the weld is desired and so as to eliminate slamming of the electrode pairs against the work. Still another would be the setting of the position of the stud 73 relative to the base 9 so as to adjust the amount of restriction of the opening movement of the cylinder 17 to attain the desired angularity of tilting or tripping of the electrodes away from the work for clearance purposes. Or with respect to the last adjustment to eliminate the tilting or tripping action by backing off the stud 73 so that it doesn't restrict the opening movement of the cylinder. In any case slight variation in the setting of the finger 57 to accommodate minor variations in the dimensions of the workparts may or may not require re-adjustment of the spring pressures on the springs 95 and 97 or of the setting of the position of the stud 73 but moderate or major changes in the setting of the finger certainly would. It is within the scope of the present invention to provide a modification employing internal compensation wherein the setting of the finger 57 can simultaneously provide of all the other foregoing adjustments for any given set-up and this entails merely a design consideration of problems of space in the device, in accordance with the following teaching. The springs 95 and 97 to accomplish this should operate against the slide bar 49 to which the finger 57 is attached instead of against the base 9 as in the embodiment shown. The moveable ends of the springs 95 and 97 would still be carried on opposite ends of the equalizing shaft but they would be arranged, as by raising them physically, so that their stationary ends would abut the slide bar 49 at suitable locations on it instead of being disposed in blind apertures in the base as shown. Likewise the stud 73 should strike the slide bar 49 instead of the base 9 in restricting the opening movement of the cylinder and could be raised on the bar 75 to do this. If the device were thusly modified then any variation in the setting of the finger 57 would not affect the spring pressures on the springs 95 and 97 nor the setting of the stud 73 which would mean that for any given set-up if the position of the work were changed one simple adjustment would move the gap to accommodate the new position of the work and automatically the relative movement of the electrodes and the amount of tripping or tilting action of the gun portion would be proper. For any new set-up of course all of the other adjustments might still have to be made but once they were made they wouldn't have to be changed merely because of the adjustment of the setting of the finger 57.

The device may be compensated externally by mounting the base 9 on a slide bar arrangement whereby it would be slideably mounted on suitable stationary structure and be adjustable into selectively fixed positions so that the gap between the electrodes could be moved longitudinally with respect to the work without having to change any of the foregoing adjustments.

For certain applications it may be desired to take advantage of the tilting action of the cylinder and piston to accommodate particular production set-ups and shapes of workpieces or for other reasons while at the same time to eliminate the pressure-equalizing feature of the device in situations where equalization of the pressure at the tips is not necessary or desired. For example, there may arise applications where the most important consideration is to swing one of the tips away from the other a maximum distance to provide clearance for the work while at the same time unequal pressures at the tips can be tolerated and in every instance the idea of means herein shown and described effecting tilting action of the cylinder and piston is employed. A simple example of such a set-up will be described in conjunction with the present drawings it being understood that the device will have to be modified in accordance with the description to follow. The welding electrode 39 may be made a stationary rigid electrode by severing the yoke member 45 transversely across its bifurcated sides 45b so that the end 45d, the bus-bar structure 41 and the electrode 39 become a unitary part which may be suitably mounted on stationary structure related to the stationary base 9. The remainder of the yoke member 45 namely the end 45a and the remaining portions of the sides 45b would still serve to tie-in the cylinder 17 and the shaft 15 which would function in substantially the same manner except that strictly speaking it could no longer be called an equalizing shaft. In this modification all of the movement will be in the welding electrode 35 which will apply all of the pressure to the workpiece W during welding and obviously there will be no equalization of the pressure between the electrodes on the workpiece which as stated may not be as important a consideration as swinging of the electrode 35 away from the electrode 39 a maximum amount to provide a greater clearance for the work. The device as thusly modified retains the inventive concept of tilting already described and in operation is quite similar to the embodiment of the invention shown in the drawings. In this modified form the electrodes 35 and 39 would be in substantially the position shown in FIG. 1 of the drawings and of course the electrode 39 would be detached from the cylinder 17 and fixedly mounted. The fluid pressure in the chamber 14 behind the piston section 26 and in the chamber 16 behind the piston section 24 would forcefully hold the electrode 35 against the workpiece W during welding and the cylinder 17 would move in the opposite direction against the base 9 or a suitable stop on the base 9 which would preferably be made adjustable. There would be no active pressure from the unit exerted on the electrode 39 which would serve in this instance merely as a back-up electrode. When the welding would be completed reversal of the fluid pressure into chamber 14 on the rod side of the piston section 26 would begin the opening movement of the electrode 35 during which the piston would move in the direction to bottom in the distal end of the cylinder 17 and the latter would be actuated by the force of fluid pressure against the center section 12 in the opposite direction until its movement would be restricted by the stud 73 and the parts would assume the position prior to tilting substantially as shown in FIG. 2. The electrode 39 of course would remain fixed and severed from the remaining portion of the yoke member 45 attached to the cylinder 17. The unbalanced fluid pressure would rotate the cylinder 17 about the axis of the shaft 15, the pivot axis being again pin 67, and the cylinder 17 and piston 24 would rotate in a clockwise direction until the piston 24 bottomed in the distal end of the cylinder and the parts would assume the position substantially as shown in FIG. 3 except that the electrode 39 would remain fixed in a horizontal position. Since the electrode 39 would remain fixed the two electrodes would not tilt into a common plane as shown in FIG. 3 as for the embodiment of the invention previously described.

Another example of the employment of the basic idea of means of tilting provided by the present invention in an application where there is no equalization of the pressures at the electrodes and wherein it is desired to swing one electrode away from the other to provide clearance for the work would be still another modification wherein the cylinder 17 and the piston 24 are mounted longitudinally adjacent and spaced from a stationary electrode and arranged to tilt entirely at one end of the cylinder which may be the distal end of the cylinder so that the entire piston and cylinder would pivot when the movement of one or the other would be restricted in its opening movement. In such a modification the piston 24 would carry the moveable pressure-applying electrode and by means of a bell-crank bus-bar structure or other suitable means between the end of the piston and the electrode it carries pressure would be applied through it in the closing movement of the piston for welding and in the opening movement of the piston the bell-crank bus-bar structure would swing the moveable electrode away from the stationary electrode and the arrangement would be such that the opening movement of the piston would be restricted preventing it from bottoming in the distal end of the cylinder whereupon the entire cylinder and piston would pivot about the distal end of the cylinder and swing the moveable electrode and bus-bar structure with it still further away the greatest distance from the stationary electrode to provide maximum clearance for the work.

It will thus be seen that there has been provided by the instant invention a fluid-operated pressure-applying device in which the various objects hereinabove set forth together with many thoroughly practical advantages are successfully achieved. While the preferred embodiment of the invention has been disclosed it is to be understood that modifications, variations and changes may be resorted to without departing from the spirit of the invention or the scope of the appended claims.

I claim:

1. A pressure-applying pressure-equalizing device having a mounting base, a pair of opposed pressure-applying tips, a fluid-operated drive for said tips comprising two primary elements, one element a piston having its piston rod operating out of the front end of said drive, said piston rod joined to the tip nearest said front end and transmitting thereto the fluid force applied to the piston, a connecting arrangement between the other element of said drive and the tip furthest from said front end and transmitting thereto the fluid force applied to said other element, a mounting arrangement for reciprocating said drive relative to the base which equalizes the pressure applied between said tips, the applied pressure transmitted in a circle of forces at the front end of the drive via said connecting arrangement, said mounting arrangement interconnected with said connecting arrangement but transmitting no part of this circle of forces and being independent force-wise of said connecting arrangement.

2. The mechanism claimed in claim 1 and in which the interconnection between the mounting arrangement and said connecting arrangement is at a location with reference to the pair of tips so as not to be spanned by the gap traversed by said tips.

3. A pressure-equalizing resistance welding device having a mounting base, a pair of opposed pressure-applying current-carrying electrodes, a fluid-operated drive for said electrodes comprising a cylinder and piston, the piston rod for the piston operating out of the front end of the cylinder and joined to the electrode nearest said front end and transmitting thereto the fluid force applied to the piston, a connecting arrangement between the front end of the cylinder and the electrode furthest from said front end and transmitting thereto the fluid force applied to the cylinder, a mounting arrangement for reciprocating the cylinder relative to the base of the device which equalizes the welding pressure applied between said electrodes, the applied welding pressure transmitted in a circle of forces at the front end of the drive via said connecting arrangement, said mounting arrangement interconnected with said connecting arrangement but transmitting no part of this circle of forces and being independent force-wise of said connecting arrangement.

4. The mechanism claimed in claim 3 and in which the interconnection between the mounting arrangement and said connecting arrangement is at a location with reference to the pair of electrodes so as not to be spanned by the welding gap traversed by said electrodes.

5. The mechanism claimed in claim 4 and in which the mounting arrangement for reciprocating the cylinder relative to the base of the device includes a shaft mounted in the base and in which the cylinder is mounted for reciprocative movement relative to the base via the shaft.

6. The mechanism claimed in claim 5 and in which the connecting arrangement includes a yoke having one end joined to the front end of the cylinder and another end carrying the furthest electrode, said yoke also interconnected with said shaft so that the cylinder is carried on the shaft via the yoke.

7. The mechanism claimed in claim 6 and in which the interconnection between said shaft and said yoke is not spanned by the welding gap traversed by said electrodes.

8. The mechanism claimed in claim 7 and in which the cylinder is slidable in relation to the base and the shaft is fixedly secured to one of the base and the yoke.

9. The mechanism claimed in claim 8 and in which the shaft is slidable in the base and the yoke is fixedly secured to the shaft.

10. The mechanism claimed in claim 4 and in which the connecting arrangement includes a yoke having one end joined to the front of the cylinder and another end carrying the furthest electrode, the connection between said one yoke end and the front end of the cylinder including means through which the piston rod operates and by which said front cylinder end is gripped, whereby the connection is useable for cylinders with different bores and different strokes and isn't wider than the widest of said yoke and cylinder to minimize center to center distances for welds when a number of said devices are operated side by side.

11. The mechanism claimed in claim 10 and in which said connection comprises a member extending from said front cylinder end through which the piston rod operates which is gripped by said one yoke end.

12. The mechanism claimed in claim 4 and in which said connecting arrangement includes a yoke having a forwardly extending end to which said furthest electrode is connected and another end for gripping the front end of the cylinder and also having means for connecting itself to still other parts of the device including said mounting arrangement.

13. The mechanism claimed in claim 4 and in which said connecting arrangement is provided with a space through it for effecting electrical connection to each electrode on a common side of said drive for more efficiently connecting the current-carrying cables to the device and keeping them out of the way of the work, each electrode having a bus-bar, the bus-bar for the nearest electrode extending through such space without increasing the width of the device, said last-mentioned bus-bar freely moveable in said space and having its free end accessible on said common side of the drive with that of the other bus-bar for cable connection.

14. The mechanism claimed in claim 13 and in which said mounting arrangement includes a shaft mounted in the base and in which the cylinder is mounted for reciprocative movement relative to the base via the shaft and in which said connecting arrangement includes a yoke having a forwardly extending end to which said furthest electrode is connected and another end for gripping the front end of the cylinder, said yoke also having spaced sides between its mentioned ends through which the bus-bar for said nearest electrode extends, said yoke also having means for connecting itself to said shaft so that the cylinder is carried on the shaft via the yoke.

15. The mechanism claimed in claim 4 and in which one elastic control is provided which governs the inertia of one of said cylinder and piston so that the relative distances the electrodes move across the welding gap in the weld stroke of the piston can be varied over maximum range, whereby to control the ease with which the electrodes meet the work and as well the timing of the two so that they meet the work at substantially the same time, characterized in a yieldable means operating on the cylinder and against the base, and further characterized in that they yieldability of said yieldable means is adjustable.

16. The mechanism claimed in claim 15 and in which a pair of elastic controls is provided which govern the inertia of both said cylinder and piston, characterized in a pair of yieldable means operating oppositely on the cylinder and against the base both coordinately in the weld stroke of the piston, and further characterized in that the yieldability of each such yieldable means is adjustable.

17. The mechanism claimed in claim 4 and in which a positive return for the electrodes is provided, said return being adjustable with reference to the base to vary the geometric center of the welding gap, said return operating on one of said cylinder and piston as a positive stop for its return movement in the return stroke of the piston, the position of said return determining the geometric center of the gap between the electrodes in their open position with reference to the base.

18. The mechanism claimed in claim 17 and in which the positive return is adjustable during operation of the device.

19. The mechanism claimed in claim 18 and in which said return is longitudinally moveable in the base and is adjustable in continuous increments over the full stroke of the piston.

20. The mechanism claimed in claim 19 and in which said positive return comprises a centering finger which operates on both said cylinder and piston as a common positive stop for the return movement of each in the return stroke of the piston.

21. The mechanism claimed in claim 4 and in which an arrangement is provided for pivotally as well as reciprocatively mounting said drive on the base whereby to impart swing paths to the electrodes so that they can move into small clearance spaces to weld and swing out of the way permitting differently flanged work pieces to be inserted between them, said pivotal arrangement comprising a pivot connection for the cylinder which is moveable therewith relative to the base.

22. The mechanism claimed in claim 21 and in which a restrictor to reciprocation of each of the cylinder and piston is provided which operates prior to the end of the return stroke of the piston, thereby positively effecting pivotal movement of the drive about said pivot connection under force of fluid pressure, characterized in that one such restrictor operates on the piston while the other operates on the cylinder.

23. The mechanism claimed in claim 22 and in which each such restrictor is adjustable independently of the other for varying the extent of pivotal movement of the drive and also the course of the swing paths of the electrodes.

24. The mechanism claimed in claim 23 and in which one such restrictor is adjustable during operation of the device.

25. The mechanism claimed in claim 24 and in which the other such restrictor is adjustable without affecting other adjustments substantially.

26. The mechanism claimed in claim 22 and in which means are provided for controlling the movement of the free end of the cylinder during pivotal movement of the drive.

27. The mechanism claimed in claim 26 and in which said controlling means for the free end of the cylinder develops a yieldable resisting force during movement of said free end into its pivoted position and a positive return for it into its non-pivoted position.

28. The mechanism claimed in claim 22 and in which an arrangement is provided for preventing pivotal movement of the drive while permitting reciprocative movement thereof relative to the base, in order that when a straight equalizing operation is desired over any pivotal of swinging movement of the electrodes, there will be no tendency for such swinging to occur, said preventing arrangement comprising means spaced from said pivot connection which is arranged to exert a force on the cylinder in opposition to and in excess of any force tending to rotate it about said pivot connection.

29. The mechanism claimed in claim 28 and in which said preventing arrangement may be operative during operation of said reciprocation restrictors in which case the piston stroke is forcefully shortened.

30. In a fluid-operated pressure-equalizing resistance welding device having a mounting base, the combination comprising a fluid operated drive including a fluid powered cylinder and piston separately carrying opposed pressure-applying current-carrying electrodes, the piston rod for the piston joined to the electrode nearest the front end of the cylinder and transmitting thereto the fluid force applied to the piston, a yoke member joining said front cylinder end and the furthest electrode, said yoke member transmitting to said furthest electrode the fluid force applied to the cylinder, the welding pressure applied between said electrodes transmitted in a circle of forces at the front end of the cylinder via said yoke member, an equalizing shaft mounted in the base, said yoke member interconnecting the cylinder and the equalizing shaft for reciprocating the cylinder relative to the base, the equalizing shaft transmitting no part of said circle of forces and being independent force-wise of said yoke member.

31. The mechanism claimed in claim 30 and in which the equalizing shaft is slidably carried in the base and the cylinder is fixed to said shaft via said yoke member.

32. The mechanism claimed in claim 31 and in which the cylinder is pivotally fixed to the shaft via said yoke member.

33. The mechanism claimed in claim 30 and in which a compression spring operates on the cylinder and against the base to control the inertia during the weld stroke of one of the cylinder and piston.

34. The mechanism claimed in claim 30 and in which a pair of compression springs operates oppositely on the cylinder and against the base to control the inertia during the weld stroke of each of the cylinder and piston.

35. The mechanism claimed in claim 30 and in which means is provided for varying the location of the geometric center of the gap between the electrodes in their open position with reference to the base, said means operating on one of the cylinder and piston to serve as a positive stop for it in its opening movement during the return stroke of the piston.

36. The mechanism claimed in claim 35 and in which said means comprises a member which is moveable longitudinally of the base.

37. The mechanism claimed in claim 36 and in which said member is positionable longitudinally of the base during operation of the device.

38. The mechanism claimed in claim 37 and in which said member is positionable in continuous increments over the full stroke of the piston.

39. The mechanism claimed in claim 38 and in which said member is a centering finger which operates on both the cylinder and piston to serve as a common positive stop for them in their opening movement in the return stroke of the piston.

40. The mechanism claimed in claim 32 and in which a restrictor to reciprocation of each of the cylinder and piston is provided, one such restrictor moveable with the cylinder and co-acting with parts on the base to pivot the drive about said pivot connection at a predetermined point in the return stroke of the piston.

41. The mechanism claimed in claim 40 and in which said one restrictor is adjustable without affecting other adjustments substantially for varying the extent of pivotal movement of the drive and the swing paths of the electrodes.

42. In a fluid-operated pressure-equalizing resistance welding device having a mounting base and a fluid powered cylinder and piston reciprocatively mounted on the base and separately carrying opposed pressure-applying current-carrying electrodes, adjustable means for varying the location with reference to the base of the geometric center of the gap between the electrodes in their open position, said means serving as a positive stop for one of said cylinder and piston in its opening movement during the return stroke of the piston.

43. The mechanism claimed in claim 42 and in which said means is adjustable during operation of the device.

44. The mechanism claimed in claim 43 and in which said means is adjustable in continuous increments over the full stroke of the piston.

45. The mechanism claimed in claim 42 and in which said means is a centering finger which serves as a common positive stop for both of said cylinder and piston in their opening movement in opposite directions during the return stroke of the piston.

46. In a fluid-operated pressure-applying pressure-equalizing device having a mounting base and a fluid powered piston and cylinder member moveable on the base oppositely of each other, a pressure-applying tip carried by one of said members, a shaft slidably carried in the base, a yoke member joining said shaft and the cylinder member, a pivot connection between the yoke member and said shaft, and means for pivoting the cylinder member about said pivot connection during the piston stroke.

47. For use in a fluid-operated pressure-equalizing resistance welding device having a fluid powered cylinder and piston, a centering finger adapted to be slidably carried in the base of the device and having a structure at one of its ends to act as a common positive stop for the cylinder and piston of the device, said structure being bifurcated to permit the piston rod of the device to pass between its bifurcations.

48. For use in a fluid-operated pressure-equalizing resistance welding device having a fluid powered cylinder, a yoke member having one of its ends constructed for carrying one of the opposing electrodes of the device, said member having spaced sides joined at said one end and also at another end thereof, said member having means at said other end for connecting the same to the cylinder of the device, said member having an opening through it between said sides, said member also having means for joining itself to other parts of the device.

49. For use in a fluid-operated pressure-equalizing resistance welding device, having a fluid powered cylinder and piston, the combination comprising a yoke member having one of its ends constructed for carrying one of the opposing electrodes of the device, said yoke member having spaced sides joined at said one end and also at another end thereof, said member having means at said other end for connecting the same to the cylinder of the device, said member having an opening through it between said sides, said member also having means for joining itself to other parts of the device, and a centering finger adapted to be slidably carried in the base of the device to act as a common positive stop for the cylinder and piston of the device, said centering finger fitting between the sides of said yoke member.

50. For use in a fluid-operated pressure-equalizing resistance welding device, a base having a bore extending longitudinally therethrough to receive a shaft, a longitudinally extending slideway formed in the base above and parallel to said bore to receive a slide-type member, a solid abutment on the base behind the slideway having a longitudinally extending threaded aperture therethrough and a blind aperture formed in the base below and parallel to said bore to serve as a spring chamber.

51. For use in a fluid-operated pressure-equalizing resistance welding device, the combination comprising a fluid powered cylinder and piston unit constructed so that on the power stroke of the unit the piston rod for the piston travels outwardly of one end of the cylinder, a yoke member having spaced sides joined at two of its ends, one of said ends of the yoke member secured to said one end of the cylinder, the other of said ends of the yoke member constructed for carrying one of the opposing current-carrying electrodes of the device, said yoke member having an opening through it between said sides, said yoke member also having means for joining itself to other parts of the device.

52. For use in a fluid-operated pressure-equalizing resistance welding device, the combination comprising a fluid powered cylinder and piston unit constructed so that on the power stroke of the unit the piston rod for the piston travels outwardly of one end of the cylinder, and means for joining the unit by way of said one cylinder end to other parts of the device including a member secured in said one cylinder end and extending outwardly therefrom through which the piston rod operates, said member serving as means for attaching to the unit so that the unit is gripped at said one end of the cylinder by way of said member.

53. For use in a fluid-operated pressure-equalizing resistance welding device, the combination comprising a fluid-powered cylinder and piston unit constructed so that on the power stroke of the unit the piston rod for the piston travels outwardly of one end of the cylinder, a member secured in said one cylinder end and extending outwardly therefrom through which the piston rod operates, a yoke member having spaced sides joined at two of its ends, means fastening one of said yoke member ends and said secured member together so that the unit is gripped thereby, the other of said yoke member ends constructed for carrying one of the opposing electrodes of the device, and means on the yoke member for joining itself to other parts of the device.

54. In a fluid-operated pressure-equalizing resistance welding device having a fluid operated cylinder and piston drive, the combination comprising a base and a shaft slidably carried in the base, means on the shaft for mounting a cylinder and piston for reciprocative and pivotal movement relative to the base, a member having adjustably fixed positions movable with the shaft for co-acting with parts on the base for preventing reciprocation of the cylinder at predetermined points in the range of movement of the shaft relative to the base, and means on the shaft for preventing pivotal movement of the cylinder while permitting reciprocative movement thereof relative to the base.

55. In a fluid-operated pressure-applying device having a mounting base, a fluid powered cylinder and piston separately carrying opposed pressure-applying tips and constructed so that on the power stroke of the piston its piston rod travels outwardly of one end of the cylinder, the free end of the piston rod joined to the tip nearest said one end of the cylinder, a yoke member joining said one end of the cylinder and the other of said tips, means movably mounting the cylinder on the base of the device, the tips closing in one plane on the power stroke of the piston, a pivot connection for the cylinder at one of its ends, said pivot connection movable with the cylinder relative to the base, tripping mechanism causing the cylinder and piston to be tipped about said pivot connection during the return stroke of the piston, the final opening of the tips on the return stroke of the piston being in another plane angularly disposed with respect to said one plane, said tripping mechanism including means at the end of the cylinder opposite the end at which it is pivoted controlling the movement of said opposite cylinder end during the tipping of the cylinder and piston.

56. In a fluid-operated pressure-applying device having a base, means including chamber walls providing a piston chamber, a fluid-powered piston slidably carried in said piston chamber, the piston rod for the piston operating out of one end of the piston chamber, means movably mounting said chamber walls on the base of the device and providing for movement of said chamber walls and the piston oppositely of each other under force of fluid pressure, a pressure-applying tip carried by one of said chamber walls and said piston rod, a pivot connection for said chamber walls which is movable therewith relative to the base, means pivoting said chamber walls about said pivot connection at a predetermined point in one direction of the piston stroke between two angularly different positions relative to the base, the piston rod and said tip movable between said positions with said chamber walls, said tip having a different clearance with reference to the work in one of said positions than it would without such pivotal movement of the chamber walls.

57. In a fluid-operated pressure-equalizing resistance welding device having a base, the combination comprising a fluid-powered cylinder and piston unit so constructed that on the power stroke of the unit the piston rod for the piston travels outwardly of one end of the cylinder, the cylinder and piston separately carrying opposed pressure-applying current-carrying electrodes, the opposed electrodes operating beyond said one end of the cylinder, said piston rod joined to the electrode nearest said one end of the cylinder and transmitting thereto the force applied to the piston, a yoke member joining said one end of the cylinder and the electrode furthest from said one end and transmitting thereto the force applied to the cylinder, equalizing means moveably mounting the cylinder on the base of the device and providing for movement of the cylinder and piston oppositely of each other under force of fluid pressure, said electrodes opening to define a gap between them and closing across a gap to weld corresponding to such movement of the cylinder and piston, the yoke member and the equalizing means independent force-wise of each other so that the equalizing means is free of the forces transmitted between said electrodes, a pivot connection for the cylinder which is moveable therewith relative to the base, means pivoting the cylinder about said pivot connection at a predetermined point in each direction of the piston stroke between two angularly different planes relative to the base, said pivoting means including reciprocation-restricting means for each of the cylinder and piston operating in at least one direction of the piston stroke, the operating of said reciprocation-restricting means preventing the cylinder and piston from bottoming with each other in one of said two planes to cause such pivotal movement of the cylinder into the other plane, the cylinder and piston bottoming with each other in said other plane, said electrodes opening in one common plane and closing in another angularly different common plane in the opposite extremes of the piston stroke in accordance with such pivotal movement of the cylinder.

58. In a fluid-operated pressure-equalizing resistance welding device having a mounting base, a fluid-powered cylinder and piston separately carrying opposed pressure-applying current carrying electrodes, a bus-bar structure joined to each electrode and moveable therewith for carrying current thereto, equalizing means moveably mounting the cylinder on the base of the device and providing for movement of the cylinder and piston oppositely of each other under force of fluid pressure, said electrodes capable of a closing movement in which they move toward each other corresponding to the power stroke of the piston and an opening movement in which they move apart to define a gap between them corresponding to the return stroke of the piston, a pair of individually adjustable compression springs functionally corresponding one to the cylinder and the other to the piston, each said spring operating on the cylinder and against the base oppositely of the other and both coordinately in the weld stroke of the piston thereby determining the relative movement of the cylinder and piston in the weld stroke of the piston and hence the relative movement of the electrodes across the gap, said compression springs thereby controlling the location with respect to the base and to the work of the center of the contact between the electrodes in their contact positions over the length of the gap, said compression springs also serving to cushion each electrode in clamping unto the work.

References Cited in the file of this patent

UNITED STATES PATENTS

| | | |
|---|---|---|
| 1,645,705 | Ledwinka | Oct. 18, 1927 |
| 1,868,777 | Thompson | July 26, 1932 |
| 2,190,692 | Bitler et al. | Feb. 20, 1940 |
| 2,341,153 | Weightman | Feb. 8, 1944 |
| 2,372,413 | Weightman | Mar. 27, 1945 |
| 2,879,373 | Fagge | Mar. 24, 1959 |